Patented June 9, 1953

UNITED STATES PATENT OFFICE 2,641,607

METHOD FOR PREPARING UNSATURATED NITRILES

Charles J. Albisetti, Jr., and Norman G. Fisher, Wilmington, Del., assignors to E. I. du Pont de Nemours & Company, Wilmington, Del., a corporation of Delaware No Drawing. Continuation of application Serial No. 101,905, June 28, 1949. This application June 15, 1950, Serial No. 168,387

15 Claims. (Cl. 260—465.3)

This invention relates to a new method of preparing unsaturated nitriles and to a new class of monoolefinic nitriles.

This application is a continuation of our application Serial No. 101,905, filed June 28, 1949, now abandoned.

Heretofore unsaturated nitriles have been prepared from unsaturated organic halides by replacement of the halogen atoms with the nitrile group by means of a metal cyanide. Unsaturated nitriles have also been prepared from certain types of unsaturated carbocyclic compounds by cyanoethylation with acrylonitrile in the presence of an alkaline catalyst. However, these methods have not been completely satisfactory for various reasons. In the former method, the particular unsaturated halides required as starting materials are usually quite difficult to obtain. The latter method is obviously applicable only to the preparation of certain nitriles having a carbocyclic nucleus and a certain arrangement of carbon atoms.

It is an object of this invention to provide a new method for preparing unsaturated nitriles. Another object is to provide a new class of monoolefinic nitriles. Other objects will appear hereinafter.

These objects are accomplished by a process which comprises heating under superatmospheric pressure, a mixture free from a polymerization catalyst and containing a 2-alkene-nitrile of the formula

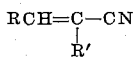

wherein R and R' are hydrogen or alkyl, and a neutral non-conjugated ethylenically unsaturated compound having adjacent to one of the doubly bonded carbons, a carbon atom having attached thereto at least one hydrogen atom, and the said doubly bonded carbons being free of cyano groups attached thereto. It has now been found that unsaturated nitriles can be prepared by heating under superatmospheric pressure in the absence of a polymerization catalyst a 2-alkenenitrile of the above formula with a neutral olefinically unsaturated compound, free of conjugated unsaturation, having preferably an acyclic olefinic double bond and having adjacent to one of the doubly bonded carbons a carbon atom having attached thereto at least one hydrogen atom, the said doubly bonded carbons being free of cyano groups attached thereto.

When the neutral olefinic compound is a monoolefinic hydrocarbon and the 2-alkenenitrile is acrylonitrile, this process produces unsaturated aliphatic hydrocarbon nitriles containing solely hydrogen, carbon and nitrogen atoms, and having as the sole carbon-carbon unsaturation an ethylenic double bond joined to the carbon in the 5-position, the carbons being numbered beginning with the carbon atom of the nitrile group, and the carbons in the 2- and 3-positions each having two hydrogen atoms attached thereto. Preferred 5-alkenenitriles of this type contain from 6 to 15 carbon atoms. However, 5-alkenenitriles containing more than 15 carbon atoms can be prepared by this invention.

A convenient method for carrying out the process of this invention, which is particularly suitable for the preparation of mononitriles, consists in heating a mixture of the 2-alkenenitrile e. g., acrylonitrile, and the neutral olefinic compound of the type defined above, e. g., isobutylene, in at least equimolar proportions and preferably with an excess of the neutral olefinic compound, in a reaction vessel capable of withstanding high pressures to a temperature between 215° and 330° C. under the autogenous pressure developed by the reaction mixture, usually of from 25 to 1020 atm. It is essential that no polymerization catalyst be present in the reaction mixture. A polymerization inhibitor is advantageously included to prevent polymerization of the unsaturated reactants; however, the inhibitor is not essential since the reaction proceeds in the absence of such a material. The resulting addition product of one mole of the 2-alkenenitrile with one mole of the neutral olefinic compound is isolated from the reaction mixture by conventional methods, e. g., by fractional distillation. The addition product is an unsaturated nitrile having a single double bond between the fifth and sixth carbon atoms of the nitrile.

Since the products obtained, the 5-alkenenitriles, are olefinic compounds of the same type as the neutral olefinic reactant, they are suitable unsaturated compounds for further reaction with another molecule of the 2-alkenenitrile. The reaction of the 5-alkenenitrile with another molecule of the 2-alkenenitrile under the conditions just described yields unsaturated dinitriles.

The process of this invention can also be carried out in a continuous manner. In this embodiment, which is very desirable for large scale operations, the mixture of the 2-alkenenitrile and the ethylenically unsaturated compound is passed through a heated reaction tube under superatmospheric pressure, e. g., 25–1020 atm., if desired in the presence of an inert diluent, e. g., benzene, heated to a temperature of 215° to 330° C., and preferably at 250–330° C. The resultant 5-alkenenitrile is isolated from the reaction mixture by fractional distillation.

The invention is illustrated further by the following examples in which the proportions of the reactants are expressed in parts by weight unless otherwise specified.

Example I

A reaction vessel capable of withstanding high pressures is charged with 200 parts of isobutylene, 80 parts of acrylonitrile and 5 parts of hydroquinone (polymerization inhibitor), and heated at 235° C. for 4 hours. The maximum pressure developed is 950 atm. and there is a pressure drop of 500 atm. during the course of the reaction. At the end of this reaction period the reaction mixture is removed and distilled. There is obtained 72 parts of 5-methyl-5-hexenenitrile, a colorless, clear liquid having a boiling point of 182° C. and a refractive index, $n_D^{25}$, of 1.4321. The product is soluble in alcohol but insoluble in water. Analysis: Calculated for $C_7H_{11}N$: C, 77.03; H, 10.16%; N, 12.83%. Found: C, 77.04%; H, 10.30%; N, 12.60%. The 5-methyl-5-hexenenitrile is further characterized by hydrolyzing it with alcoholic alkali to a liquid acid which is then reacted with α-bromo-p-bromoacetophenone. The p-bromophenacyl ester is isolated from the reaction mixture. This product has a melting point of 48–51° C. and a mixed melting point of 49–51° with an authentic sample of p-bromophenacyl 5-methyl-5-hexenoate.

By heating 40 parts of acrylonitrile, 0.1 part of hydroquinone, and 225 parts of isobutylene at 215° and 990 atm. for 8 hours, there is obtained 37 parts of 5-methyl-5-hexenenitrile.

A mixture of 614 parts of isobutylene, 244 parts of acrylonitrile and 2 parts of hydroquinone is heated 4 hours at 235° and 585–1020 atm. There is obtained 280 parts of 5-methyl-5-hexenenitrile.

Example II

A mixture of 182.2 parts of benzene, 47.4 parts of acrylonitrile and 500 parts of isobutylene is passed through a 55-ft. section of ¼" x ⅛" stainless steel tubing during a period of one hour at a temperature of 310° C. and under 600 atms. pressure. The reaction product is distilled and there is obtained 49 parts of 5-methyl-5-hexenenitrile. This corresponds to a 50.3% conversion based on the amount of acrylonitrile charged. At 330° and 600 atms. with the same feed there is obtained 23% of 5-methyl-5-hexenenitrile.

Example III

Two hundred parts of isobutylene and 100 parts of methacrylonitrile are heated under the conditions described in Example I with the exception that no polymerization inhibitor is used. A maximum pressure of 860 atm. is reached during the reaction and the pressure drop amounts to 200 atm. On distillation of the reaction mixture there is obtained 14 parts of 2,5-dimethyl-5-hexenenitrile boiling at 183–187° C. Redistillation of the crude 2,5-dimethyl-5-hexenenitrile gives a product boiling at 186–187° C. and having a refractive index, $n_D^{25}$, of 1.4308, and the following analytical data: Calculated for $C_8H_{13}N$: N, 11.37%. Found: N, 11.59%.

Example IV

A pressure reactor is charged with 175 parts of diisobutylene (approximately 80% 2,4,4-trimethylpentene-1 and 20% 2,4,4-trimethylpentene-2), 100 parts of acrylonitrile and 1 part of copper resinate (polymerization inhibitor) and heated at 250° C. for 4 hours. A maximum pressure of 375 atm. is reached and a pressure drop of 315 atm. occurs during the reaction. Distillation of the reaction product gives 32 parts of product, principally 5-methylene-7,7-dimethyl-octanenitrile admixed with a minor amount of 4-t-butyl-5-methyl-5-hexenenitrile, having a boiling point of 234–238° C. and a refractive index, $n_D^{25}$, of 1.4444. Analysis: Calculated for $C_{11}H_{19}N$ (the adduct of 1 mole of diisobutylene to one mole of acrylonitrile): N, 8.47%. Found: N, 8.96% and 9.09%.

When 1635 parts of diisobutylene, 400 parts of acrylonitrile and 5 parts of hydroquinone is heated 4 hours at 245° C. and 2 hours at 255° C., the pressure reaches a maximum of 28.6 atm. and falls to 23.8 atm. during the course of the reaction. There is obtained 215 parts of the mixture of 5-alkenenitriles boiling at 126–134° C./30 mm.

Example V

Using the procedure described in Example I, 160 parts of propylene, 67 parts of methacrylonitrile and 5 parts of hydroquinone are heated at 260° C. for 5 hours. The maximum pressure obtained is 625 atm. and the pressure drops to 410 atm. during the course of the reaction. From the reaction mixture there is obtained 8 parts of 2-methyl-5-hexenenitrile boiling at 156–164° C. On redistillation the product boils at 159–162° C. and has a refractive index, $n_D^{25}$, of 1.4288. Analysis: Calculated for $C_7H_{11}N$: N, 12.83%. Found: N, 12.66%; 12.52%.

Example VI

A mixture of 50 parts of acrylonitrile and 200 parts of tetramethylethylene is heated in a pressure reactor at 235° C. for 8 hours. The maximum pressure obtained is 190 atm., with a pressure drop of 130 atm. during the course of the reaction. Distillation of the crude reaction product yields 140 parts of tetramethylethylene and 16 parts of 4,4,5-trimethyl-5-hexenenitrile, a clear liquid boiling at 205–209° C. Redistillation of this product gives a fraction boiling at 206–209° C. Analysis: Calculated for $C_9H_{15}N$: N, 10.22%. Found: N, 10.18%, 10.32%.

Example VII

A mixture of 218 parts of 5-methyl-5-hexenenitrile, 79 parts of acrylonitrile and 1 part of hydroquinone is heated in a pressure reactor at 235° C. for 4 hours. There is recovered from the reaction mixture 32 parts (40%) of acrylonitrile and 147 parts (67.5%) of 5-methyl-5-hexenenitrile. Distillation of the residual material gives 75 parts of 5-methylene-1,9-nonanedinitrile, boiling at 132–137° C. at 0.5 mm. This corresponds to a 71% yield based on the hexenenitrile consumed. Analysis: Calculated for $C_{10}H_{14}N_2$: N, 17.27%. Found: N, 17.04%, 16.96%.

Example VIII

A mixture of 111 parts of methyl 5-methyl-5-hexenoate and 26 parts of acrylonitrile is heated in an autoclave under autogenous pressure for 5 hours at 230° C. Distillation of the crude reaction mixture gives 13 parts of acrylonitrile, 60 parts of unchanged ester, and 9 parts of methyl 5-methylene-8-cyanooctanoate, boiling at 112–115° C. at 0.9 mm. Analysis: Calculated for $C_{11}H_{17}O_2N$: N, 7.18%. Found: N, 6.99%, 7.05%.

Example IX

A mixture of 150 parts of allyl cyanide, 50 parts of acrylonitrile, and 1 part of copper resinate is heated under autogenous pressure at 250° C. for 3 hours in a pressure reactor. After removal of unchanged allyl cyanide from the reaction mixture by distillation, there is obtained 10 parts of 2-heptenedinitrile boiling at 82-85° C. at 0.5 mm. Analysis: Calculated for $C_7H_8N_2$: N, 23.26%. Found: N, 22.35%, 22.69%.

Example X

A mixture of 200 parts of mesityl oxide, 50 parts of acrylonitrile and one part of hydroquinone is heated in a pressure rector at 240° C. for 4 hours. There is recovered from the reaction mixture by distillation 105 parts of mesityl oxide. There is isolated 10 parts of an unsaturated cyanoketone, the addition product of 1 mole of acrylonitrile to 1 mole of mesityl oxide, and believed to be 4-acetyl-5-methyl-5-hexenenitrile, a yellow liquid boiling at 139-142° C. at 12.5 mm. Analysis: Calculated for $C_9H_{13}ON$ (the monoadduct): N, 9.27%. Found: N, 8.98%, 8.78%.

Example XI

A mixture of 200 parts of beta-pinene and 50 parts of acrylonitrile stabilized with hydroquinone is heated in a pressure vessel for six hours at 230° C. and 60 atm. maximum pressure. Distillation of the reaction mixture gives 90 parts of recovered beta-pinene, 32 parts of a middle fraction and 74 parts of a liquid boiling at 140-158° at 50 mm. Redistillation of the last fraction gives 40 parts of the addition product of one mole of acrylonitrile with one mole of beta-pinene, 6,6-dimethylbicyclo[3.1.1]-2-heptene-2-butanenitrile, having a boiling point of 127-129° C. at 5 mm. Analysis: Calculated for $C_{13}H_{19}N$: N, 7.34%. Found: N, 7.35%, 7.56%.

Example XII

A mixture of 100 parts of acrylonitrile and 200 parts of methallyl alcohol is heated in a pressure vessel at 245° C. for six hours. Distillation of the reaction mixture gives 114 parts of recovered alcohol, 14 parts of yellow liquid boiling at 113 to 130° C. at 2 mm. and 75 parts of residue. Redistillation of the yellow liquid gives 4 parts of a cyano alcohol boiling at 102° C. at 0.8 mm. This product is 5-(hydroxymethyl)-5-hexenenitrile.

Example XIII

A mixture of 165 parts of bimethallyl, 40 parts of acrylonitrile and 0.1 part of hydroquinone is heated for three hours at 245° C. in an autoclave. By distillation of the reaction product, there is obtained 92 parts of bimethallyl and 26 parts of a mixture of 5,8-dimethyl-5,8-nonadienenitrile and 5,8-dimethylenenonanenitrile boiling at 140-142° C./30 mm. and having a refractive index, $n_D^{25}$, of 1.4623. Analysis: Calculated for $C_{11}H_{17}N$: N, 8.58%. Found: N, 8.90%.

Example XIV

A mixture of 246 parts of cyclohexene, 53 parts of acrylonitrile and 0.1 part of hydroquinone is heated in an autoclave for three hours at 245° C. and two hours at 255° C. All but a minor portion of the product boils below 84° C. Distillation of the residue gives 3 parts of 3-(2-cyanoethyl)-cyclohexene boiling at 228° C. Analysis: Calculated for $C_9H_{13}N$: N, 10.36%. Found: N, 10.10%, 9.89%.

Example XV

A mixture of 53 parts of acrylonitrile, 36 parts of water, 168 parts of isobutylene, and 0.1 part of hydroquinone is heated in a pressure reactor for two hours at 245° C. After separating 26 parts of water from the liquid reaction mixture, distillation of the organic residue gives 19 parts of acrylonitrile, 32 parts of 5-methyl-5-hexenenitrile boiling at 182° C., and 7 parts of higher boiling liquid.

In addition to the acrylonitrile and methacrylonitrile of the examples, other 2-alkenenitriles, i. e., unsaturated hydrocarbon nitriles containing as the sole aliphatic unsaturation a single olefinic linkage and that between the second and third carbon atoms of the nitrile, can be used in the process of this invention. For example, 2-alkenenitriles can be used having the formula

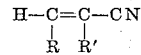

wherein R and R' are hydrogen atoms or alkyl, preferably methyl radicals. Specific examples of other 2-alkenenitriles which are operable include 2-butenenitrile. Since the 2-alkenenitriles containing 3 to 4 carbon atoms are readily available they are preferred for use in the process of this invention.

The second of the unsaturated reactants employed in the process of this invention is any neutral olefinic compound having at least one olefinic linkage, free of conjugated unsaturation, having joined to one of the doubly bonded carbons a carbon atom containing at least one hydrogen atom attached thereto, and said doubly bonded carbons being free of cyano groups attached thereto. Acidic olefinic compounds are specifically excluded since they react in a different way with 2-alkenenitriles. The essential part of these compounds which is necessary for reaction with the 2-alkenenitrile is the

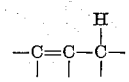

structure. Specific example of unsaturated compounds of this type which are used in the process of this invention include hydrocarbons such as propylene, isobutylene, diisobutylene, triisobutylene, beta-pinene, tetramethylethylene, 2-butene, biallyl, bimethallyl, alpha-methylstyrene, 1-pentene, 1-decene, cyclohexene and allylbenzene; nitriles such as allyl cyanide, 5-methyl-5-hexenenitrile, and 5-hexenenitrile; esters such as methyl 5-methyl-5-hexenoate; ketones such as mesityl oxide; alcohols such as methallyl alcohol; and aldehydes such as 5-methyl-5-pentenal. Thus these neutral unsaturated compounds contain the structure

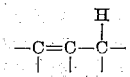

and have preferably from 3 to 12 carbon atoms with from 1 to 2 ethylenically unsaturated nonconjugated double bonds as the sole aliphatic unsaturation. They can also contain nitrogen in a nitrile group (but not joined to unsaturated carbon) or oxygen in a carbonyl, carbalkoxy or hydroxyl group. The preferred types of these neutral unsaturated compounds are the open-chain monoolefinic hydrocarbons of the above-defined structure. Especially preferred are those monoolefinic hydrocarbons having 3 to 12 carbon atoms and having an alkyl group, preferably methyl, as a side chain attached to at least one of the carbon atoms comprising the ethylenic linkage.

A more precise understanding of this reaction may be afforded by the following mechanism, which is believed to represent the course of the addition of 2,4,4-trimethylpentene-1 to acrylonitrile.

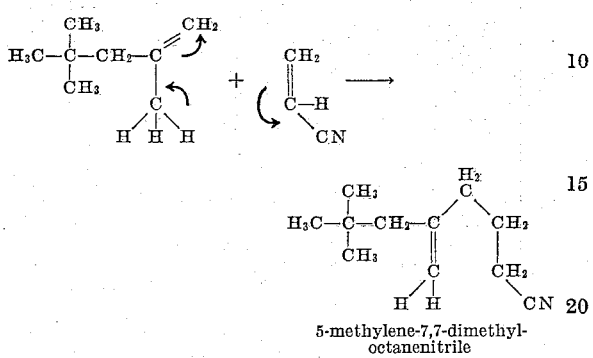

5-methylene-7,7-dimethyl-octanenitrile

The two compounds are represented as approaching in such a way as to approximate a 6-membered ring. The arrows indicate shifts of electron pairs, i. e., relocation of bonds between atoms.

The proportions of the two types of reactants can be varied widely in the process of this invention. Equimolar proportions of the 2-alkenenitrile and the above-defined neutral olefinic compound are operable, but it is preferable to use an excess, preferably a 300–400% excess, of the neutral olefinic compound since better yields of the resultant unsaturated nitriles having a double bond in the 5-position with respect to a nitrile group are obtained.

The hydroquinone and copper resinate polymerization inhibitors mentioned in the examples can be replaced, if desired, by other polymerization inhibitors. Examples of other such materials which can be used include naphthylamines, beta-naphthol and other antioxidants.

The reaction between the 2-alkenenitrile and the other monoolefinic compound takes place under the conditions of this invention in the absence of an inert diluent or solvent. However, a solvent or diluent can be used if desired. In this case inert organic solvents which can be used include hydrocarbons such as benzene, toluene, and cyclohexane, ethers such as dioxane, and esters such as ethyl or butyl acetate. The reaction also takes place in the presence of water as a diluent, the water serving as a heat transfer medium.

The products obtained by the process of this invention are particularly useful as chemical intermediates. The unsaturated mononitriles obtained by the addition of one mole of the 2-alkenenitrile to one mole of the neutral olefinic compound having a hydrogen-bearing carbon atom adjacent to the olefinic linkage are useful for conversion to unsaturated amines by reduction and to the corresponding unsaturated carboxylic acids by hydrolysis. The resultant unsaturated mononitriles are also useful for further reaction with another molecule of a 2-alkenenitrile by the process of this invention to form unsaturated dinitriles.

As many apparently widely different embodiments of this invention may be made without departing from the spirit and scope thereof, it is to be understood that this invention is not limited to the specific embodiments thereof except as defined in the appended claims.

We claim:
1. A method for preparing unsaturated nitriles which comprises heating at a temperature of 215° to 330° C. under superatmospheric pressure of 25 to 1020 atmospheres, a mixture free from a polymerization catalyst and containing a neutral ethylenically unsaturated compound having from 1 to 2 ethylenically unsaturated non-conjugated double bonds as the sole aliphatic carbon-to-carbon unsaturation, and having adjacent to one of the doubly bonded carbons a carbon atom having attached thereto at least one hydrogen atom and the said doubly bonded carbon atoms being free of cyano groups attached thereto, and a 2-alkenenitrile having the formula

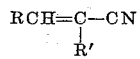

wherein R and R' are selected from the class consisting of hydrogen and alkyl radicals, and separating from the reaction mixture as the resulting product an unsaturated nitrile having at least six carbon atoms and having a non-conjugated double bond attached to the carbon in the 5-position.

2. A method for preparing unsaturated nitriles which comprises heating at a temperature of 215° to 330° C. under superatmospheric pressure of 25 to 1020 atmospheres, a mixture free from a polymerization catalyst and containing an ethylenically unsaturated hydrocarbon having from 1 to 2 ethylenically unsaturated non-conjugated double bonds as the sole aliphatic carbon-to-carbon unsaturation, and having adjacent to one of the doubly bonded carbons a carbon atom having attached thereto at least one hydrogen atom, and a 2-alkenenitrile having the formula

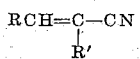

wherein R and R' are selected from the class consisting of hydrogen and alkyl radicals, and separating from the reaction mixture as the resulting product an unsaturated nitrile having at least six carbon atoms and having a non-conjugated double bond attached to the carbon in the 5-position.

3. A method as set forth in claim 1 in which said mixture contains a polymerization inhibitor.

4. A method as set forth in claim 1 in which said 2-alkenenitrile is acrylonitrile.

5. A method as set forth in claim 1 in which said 2-alkenenitrile is methacrylonitrile.

6. A method for preparing a 5-alkenenitrile which comprises heating at a temperature of 215° to 330° C. under superatmospheric pressure of 25 to 1020 atmospheres a mixture free from a polymerization catalyst and containing a monoolefinic hydrocarbon having an acyclic olefinic double bond and having adjacent to one of the doubly bonded carbons a carbon atom having attached thereto at least one hydrogen atom and a 2-alkenenitrile having the formula

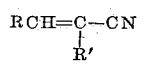

wherein R and R' are selected from the class consisting of hydrogen and alkyl radicals, and separating from the reaction mixture as the resulting product a 5-alkenenitrile.

7. A method as set forth in claim 6 in which said mixture contains a polymerization inhibitor.

8. A method as set forth in claim 6 in which said 2-alkenenitrile is acrylonitrile.

9. A method as set forth in claim 6 in which said 2-alkenenitrile is methacrylonitrile.

10. A method for preparing a 5-monoolefinic nitrile which comprises heating at a temperature of 215° to 330° C. under superatmospheric pressure of 25 to 1020 atmospheres a mixture free from a polymerization catalyst and containing acrylonitrile and a monoolefinic hydrocarbon of not more than 12 carbon atoms having an acyclic olefinic double bond and having adjacent to one of the doubly bonded carbons a carbon atom having attached thereto at least one hydrogen atom and having an alkyl group as a side chain attached to at least one of the doubly bonded carbon atoms, and separating from the reaction mixture as the resulting product a 5-monoolefinic nitrile.

11. A method for preparing 5-methyl-5-hexenenitrile which comprises heating at a temperature of 215° to 330° C. under superatmospheric pressure of 25 to 1020 atmospheres a mixture free from a polymerization catalyst and containing acrylonitrile and isobutylene, and separating from the reaction mixture as the resulting product 5-methyl-5-hexenenitrile.

12. A method for preparing 5-methylene-7,7-dimethyloctanenitrile which comprises heating at a temperature of 215° to 330° C. under superatmospheric pressure of 25 to 1020 atmospheres a mixture free from a polymerization catalyst and containing acrylonitrile and diisobutylene, and separating from the reaction mixture as the resulting product 5-methylene-7,7-dimethyloctanenitrile.

13. A method for preparing 4,4,5-trimethyl-5-hexenenitrile which comprises heating at a temperature of 215° to 330° C. under superatmospheric pressure of 25 to 1020 atmospheres a mixture free from a polymerization catalyst and containing acrylonitrile and tetramethylethylene, and separating from the reaction mixture as the resulting product 4,4,5-trimethyl-5-hexenenitrile.

14. A method as set forth in claim 1 in which said neutral ethylenically unsaturated compound is 5-methyl-5-hexenenitrile and said 2-alkenenitrile is acrylonitrile.

15. A method as set forth in claim 1 in which said neutral ethylenically unsaturated compound is methyl 5-methyl-5-hexenoate.

CHARLES J. ALBISETTI, JR.
NORMAN G. FISHER.

References Cited in the file of this patent

UNITED STATES PATENTS

| Number | Name | Date |
|---|---|---|
| 2,232,785 | Howk | Feb. 25, 1941 |
| 2,234,566 | Lazier et al. | Mar. 11, 1941 |
| 2,280,058 | Bruson | Apr. 21, 1942 |
| 2,342,607 | Bruson et al. | Feb. 22, 1944 |
| 2,352,515 | Bruson | June 27, 1944 |
| 2,518,397 | Stover | Aug. 8, 1950 |

OTHER REFERENCES

Alder et al.: Chem. Abstracts, vol. 37, col. 4700 (1943).

La Forge et al.: Chem. Abstracts, vol. 43, col. 1334 (1949).